United States Patent
Korb et al.

[11] Patent Number: 5,460,248
[45] Date of Patent: Oct. 24, 1995

[54] BRAKE DEVICE FOR DAMPING A TRANSLATORY MOTION

[75] Inventors: Holger Korb, Maulburg; Johannes Kirchgaesser, Efringen-Kirchen, both of Germany

[73] Assignee: A. Raymond GmbH & Co. KG, Lorrach, Germany

[21] Appl. No.: 272,588

[22] Filed: Jul. 11, 1994

[30] Foreign Application Priority Data

Jul. 10, 1993 [DE] Germany ............... 43 23 095.4

[51] Int. Cl.⁶ ............... B60N 3/08; B60R 7/06; F16F 7/02
[52] U.S. Cl. ............... 188/130; 188/83; 188/166; 188/381
[58] Field of Search ............... 188/129, 130, 188/381, 83, 74, 71.1, 72.1, 166; 16/337, 341; 403/164, 165; 267/195, 196, 197, 199, 201, 202, 203, 205, 208, 209, 210, 214, 215, 216, 227, 228, 229, 257, 258, 134, 153

[56] References Cited

U.S. PATENT DOCUMENTS

| | | | |
|---|---|---|---|
| 1,275,177 | 8/1918 | Tverdahl | 267/208 X |
| 1,372,327 | 3/1921 | Young | 267/215 X |
| 1,399,795 | 12/1921 | Reif | 267/208 |
| 1,499,179 | 6/1924 | Mastrange | 188/130 |
| 1,673,268 | 6/1928 | Rouanet | 188/130 |
| 1,797,929 | 3/1931 | Rouanet | 267/208 |
| 2,075,991 | 4/1937 | Kessler | 188/130 |
| 2,308,966 | 1/1943 | Saurer | 188/130 |
| 3,820,634 | 6/1974 | Poe | 188/130 |
| 4,551,881 | 11/1985 | Hoffman | 188/166 |
| 4,653,764 | 3/1987 | McNeill | 188/83 |
| 4,833,938 | 5/1989 | Reinwall et al. | 188/130 |
| 4,836,607 | 6/1989 | Kluting | 16/341 |
| 5,002,163 | 3/1991 | Kidd | 188/83 |
| 5,133,433 | 7/1992 | Oosawa | 267/201 |

FOREIGN PATENT DOCUMENTS

| | | |
|---|---|---|
| 0538605 | 4/1993 | European Pat. Off. . |
| 045703 | 11/1935 | France ............... 267/202 |
| 2643433 | 8/1990 | France ............... 188/83 |
| 0240583 | 11/1986 | Germany ............... 188/83 |
| 293548 | 7/1928 | United Kingdom ............... 188/130 |

*Primary Examiner*—Douglas C. Butler
*Attorney, Agent, or Firm*—Finnegan, Henderson, Farabow, Garrett & Dunner

[57] ABSTRACT

A brake device for damping a translatory motion having a bearing housing and a brake disk both made of a resilient, hard elastic plastic material. The brake disk is supported for rotation in the bearing housing and adapted for rotation in response to a translatory motion, the brake disk having an outer conically shaped friction surface and the bearing housing a correspondingly configured inner conically shaped friction. The surfaces are held together when the disk is supported in the housing to generate frictional resistance between them as the disk rotates in the housing in response to a translatory motion and thereby dampen the motion.

4 Claims, 1 Drawing Sheet

5,460,248

BRAKE DEVICE FOR DAMPING A TRANSLATORY MOTION

BACKGROUND OF THE INVENTION

This invention relates to a brake device for damping a translatory motion typically initiated by a spring. Such brake devices are used in motor vehicles, for example, to damp the pivoting motion of ashtrays or the flaps of receptacle compartments in the dashboard.

Such brake or damping devices are described in EP 0 538 605 A1 and usually consist of a casing that is filled with a viscous fluid and in which is supported a friction disk that is connected by means of a shaft to a drive element. The drive element usually consists of a pinion which interacts with a rack or—in the case of an ashtray—with a gearwheel segment. Due to the rolling of the pinion on the gearwheel segment, which is fastened to an outer wall of the ashtray, the friction disk is caused to rotate in the casing that is filled, for example, with a silicone oil. The periphery of the friction disk is typically provided with radially extending notches or recesses which further increase the frictional resistance of the friction disk with the silicone oil. The pivoting motion of the ashtray or flap is thus damped in each pivoting direction by this element.

However, because of the complicated embedding of the friction disk in silicone oil, high costs are associated with the manufacture of this brake device and consequently many automobile manufacturers have heretofore declined to use it even though it provides additional operating comfort.

An object of the invention, therefore, is to design the previously mentioned brake device in such a way that its manufacture is substantially cheaper so that it will be economically justifiable to use it in a larger number of automobiles.

SUMMARY OF THE INVENTION

This object is achieved in accordance with the present invention by providing a brake device for damping a translatory motion comprising a bearing housing and a brake disk, both being made of a resilient, hard elastic plastic material, said brake disk being supported for rotation in the bearing housing and adapted for rotation in response to a translatory motion, the brake disk having an outer conically shaped friction surface and the bearing housing a correspondingly configured inner conically shaped friction surface and means for holding the surfaces together in frictional engagement when the disk is supported in the housing to generate frictional resistance between them as the disk rotates in the housing in response to a translatory motion and thereby dampen said motion.

In this arrangement, the pressure force is matched to the frictional resistance of the friction surfaces and the angle of the two conical surfaces. These should be selected in such a way that the brake disk is provided with the desired frictional resistance.

Further features of the invention are that the components necessary for the construction of the brake device can be reduced to two plastic parts which can be easily joined together, the necessary frictional resistance between the disk and bearing housing being generated or being adjustable by corresponding preload in the brake disk.

BRIEF DESCRIPTION OF THE DRAWINGS

Two embodiments of the invention are shown in the drawings and these will be described in more detail below. Of the drawings.

DETAILED DESCRIPTION OF THE INVENTION

Figure 1:
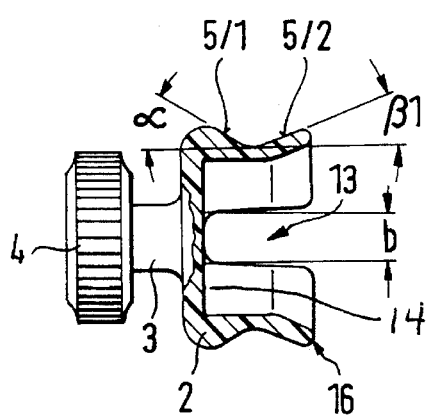
FIG. 1 is a partial sectional view of the brake disk and its drive element of the brake device of the invention.

The brake device shown in the drawings consists of a bearing housing 1 and a brake disk 2 supported for rotation in it, brake disk 2 being connected to a drive element 4 by a drive shaft 3. Bearing housing 1 and brake disk 2 are both manufactured from a resilient, hard elastic plastic material such as polyoxymethylene.

Figure 4:
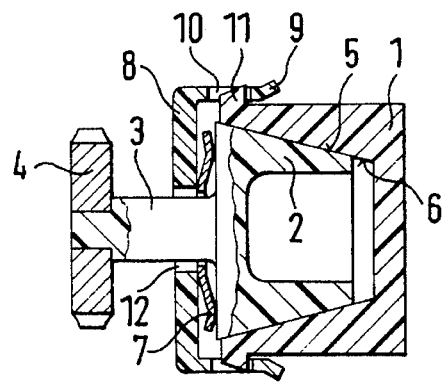
FIG. 4 is a partial sectional view of a further embodiment of the brake device.

In the brake device shown in FIG. 4, the brake disk 2 is provided with a conically shaped friction surface 5 which is pressed against a correspondingly configured friction surface 6 in a bearing housing 1. A pressure force is generated on the disk by a cup spring 7, supported by a stirrup 8, which exerts a constant force on the end of the brake disk 2 through the rim of the cup. On two diametrically opposite ends, stirrup 8 has angled engagement tabs 9 with recesses 10 which engage, in the assembled condition of the brake device, with engagement lugs 11 protruding from the rim of housing 1.

In its axial center, stirrup 8 has a hole 12 through which the drive shaft 3 of the brake disk 2 is fed before the drive element 4—a pinion gear in the present case—is pressed onto the end of the shaft.

Figure 2:
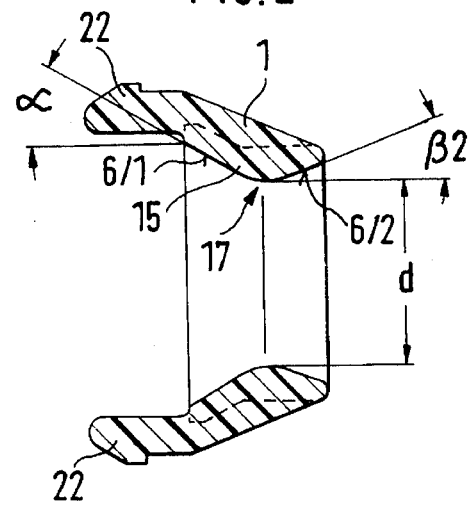
FIG. 2 is a sectional view of the bearing housing for use with the disk.
Figure 3:
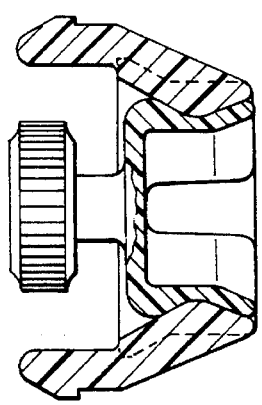
FIG. 3 shows the assembled brake device in section.

A preferred embodiment of the brake device is shown in FIGS. 1–3. The bearing housing 1 is shown in FIG. 2 and the brake disk 2 in FIG. 1.

In this case, brake disk 2 has two friction surfaces 5/1 and 5/2 on its outer surface that narrow conically towards each other and the axis of the disk. These friction surfaces 5/1 and 5/2 are interrupted by at least two slots 13 (only one of which is shown in FIG. 1) that are open at the bottom and extend from the outer rim 16 to the top 14 of the disk. The inner side of wall 15 of the bearing housing 1 that surrounds brake disk 2 in the assembled condition is provided with correspondingly configured friction surfaces 6/1 and 6/2.

In the brake disk 2, the angle of inclination $\alpha$ of the friction surface 5/1 that inclines from the top 14 of the disk towards the center is somewhat larger than the angle of inclination $\beta$ of the friction surface 5/2 that inclines away from the center and towards the outer rim 16. The width "b" of the slots 13 is dimensioned in such a way that the outer rim 16 of the friction surface 5/2 can be compressed in a resilient manner down to the diameter "d" of the throat 17 in the double-conical housing wall 15 to permit assembly of the device.

In view of the fact that the friction surface 5/2 does not spring back completely to its original position after assembly, the angle of inclination $\beta 1$ is preferably a little larger, i.e. by between 2° and 4°, in the manufactured condition than the corresponding angle of inclination $\beta 2$ of the housing wall 15 so that the two angles of inclination $\beta 1$ and $\beta 2$ are then the same in the assembled condition of the brake device (see FIG. 3).

Figure 5:
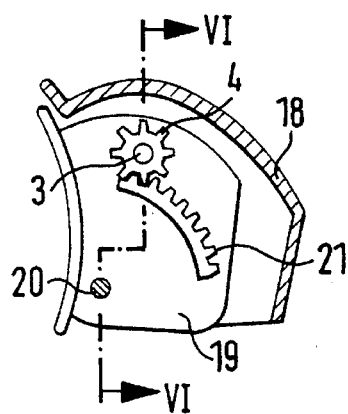
FIG. 5 is a sectional view of an ashtray casing taken along the line V—V in FIG. 6 with an ashtray installed therein.
Figure 6:
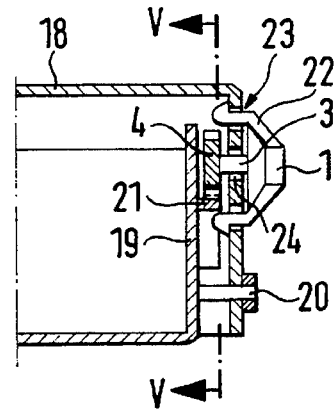
FIG. 6 is a sectional view of the ashtray casing and ashtray taken along the line VI—VI in FIG. 5 with a brake device installed therein.

The purpose of the brake device is shown in FIGS. 5 and 6 where it is used with an ashtray installed in the dashboard area of a motor vehicle. FIG. 5 shows an ashtray 19 pivotably supported in an ashtray casing 18 by means of a trunnion 20. Ashtray 19 has a gearwheel segment 21 on an outer wall and the pinion gear 4 of the brake disk 2 engages with this gearwheel segment. Thus as ashtray 19 is pivoted outwardly relative to casing 18, this motion will cause rotation of pinion gear 4.

The interaction of the ashtray and the brake device are shown in FIG. 6 which shows the brake device installed in an ashtray casing.

To secure the brake device in the ashtray casing 18, bearing housing 1 has two diametrically opposed engagement hooks 22 which protrude beyond the housing's rim so they can be pressed into corresponding recesses 23 in ashtray casing 18. Drive shaft 3 and pinion gear 4 of the device protrude likewise through a further recess 24 in the casing 18 into the internal space of the casing. Ashtray 19 is pivotably supported by trunnion 20 in the lower region of the casing 18.

The locking mechanism, which is usual for such ashtrays and which can be overcome by finger pressure against the ashtray is not shown, nor is the spring which pushes open the ashtray and which initiates the translatory motion. If the ash container 19 is pivoted open, this spring ensures that the gearwheel segment 21, by means of the pinion 4, rotates the brake disk 2 in the bearing housing 1 as the tray opens so that the necessary braking effect is achieved by means of the friction surfaces 5/1, 5/2 and 6/1, 6/2 rubbing against each other. In this way, ashtray 19 can be driven by the spring after it has been lightly touched, i.e. after the disengagement of the locking mechanism, and can pivot slowly forward while such motion is being dampened by the brake device.

What is claimed is:

1. A brake device for damping a translatory motion comprising a bearing housing and a brake disk, both being made of a resilient, hard elastic plastic material, said brake disk being supported for rotation in the bearing housing and adapted for rotation in response to a translatory motion, the brake disk being a hollow cylinder closed at one end and open at the other end, said disk having two conically shaped friction surfaces on an outer side thereof that converge inwardly towards the axis of the cylinder and each other, said surfaces intersecting at a point located between said ends, and at least two axially extending slots that extend from the open end of the cylinder toward the closed end, which slots interrupt said conical surfaces and the bearing housing having on an inner wall surface thereof two correspondingly configured conically shaped friction surfaces forming a throat between them that frictionally engage with said friction surfaces on the disk when the disk is rotatably supported in said housing and means for holding the surfaces together in contact when the disk is supported in the housing to generate frictional resistance between them as the disk rotates in the housing in response to a translatory motion and thereby dampen said motion.

2. The brake device of claim 1, wherein the angle $\alpha$ of inclination of a first one of said two conically configured friction surfaces that converges inwardly from the closed end of the cylinder toward said point and the angle of inclination of the corresponding surface on the housing is slightly greater than the angle $\beta$ of inclination of a second one of said surfaces that converges outwardly from said point toward the open end of the cylinder and the angle of inclination of the corresponding surface on the housing, the width of the slots being sufficient to permit the open end of the cylinder of the disk to be pressed through the throat of said housing and then to spring back into engagement with said housing when said intersection point of said conically configured friction surfaces on said disk reaches said throat.

3. The brake device of claim 2, wherein the angle $\beta1$ of inclination of said second surface of said disk is slightly larger than the angle $\beta2$ of inclination of the corresponding friction surface of the housing to ensure a close fit between said surfaces.

4. The brake device of claim 1, including a drive shaft extending axially away from the closed end of the disk and having a pinion gear mounted thereon adapted for engagement with a translatory motion to cause said rotation of said disk in said housing.

* * * * *